US007982886B2

(12) United States Patent
Wang et al.

(10) Patent No.: US 7,982,886 B2
(45) Date of Patent: Jul. 19, 2011

(54) DOCUMENT FIXER

(75) Inventors: Ching-Chung Wang, Taipei (TW); Chen-Ning Hsi, Taipei (TW)

(73) Assignee: Primax Electronics Ltd., Taipei (TW)

( * ) Notice: Subject to any disclaimer, the term of this patent is extended or adjusted under 35 U.S.C. 154(b) by 497 days.

(21) Appl. No.: 12/236,105

(22) Filed: Sep. 23, 2008

(65) Prior Publication Data

US 2010/0020343 A1 Jan. 28, 2010

(30) Foreign Application Priority Data

Jul. 25, 2008 (TW) ............................... 97128247 A

(51) Int. Cl.
*G06F 15/00* (2006.01)
*H04N 1/04* (2006.01)

(52) U.S. Cl. ....................................... 358/1.12; 358/498

(58) Field of Classification Search ................... 358/1.1, 358/1.9, 1.11, 1.12, 1.13, 1.14, 1.15, 1.16, 358/1.17, 1.18, 505, 498
See application file for complete search history.

*Primary Examiner* — Thierry L Pham

(74) *Attorney, Agent, or Firm* — Kirton & McConkie; Evan R. Witt

(57) ABSTRACT

A document fixer includes a supporting plate and a fixer body. The supporting plate includes a business card fixing recess and a clamping part. The fixer body includes a first supporting plate receiving part, an ordinary document fixing recess and a second supporting plate receiving part. When the supporting plate is received in the first supporting plate receiving part, the document fixer is adapted to fix a business card. Whereas, when the supporting plate is received in the second supporting plate receiving part, the document fixer is adapted to fix an ordinary document.

9 Claims, 4 Drawing Sheets

DOCUMENT FIXER

FIELD OF THE INVENTION

The present invention relates to a document fixer, and more particularly to a document fixer for fixing a document when an image of the document is captured by an image pickup device.

BACKGROUND OF THE INVENTION

Image pickup devices are usually used to take photographs or record video data. In addition, image pickup devices are applied to web cameras for holding a video conference. Recently, the commercially available notebook computer is usually equipped with a built-in image pickup device.

With increasing development of digital techniques, text documents are gradually created as electronic files. Generally, text documents are scanned by scanning apparatuses and then saved as electronic files such as PDF (Portable Document Format) files. In a case that no scanning apparatus is communicated with the notebook computer, the images of simple documents such as single-sided papers or business cards may be captured by the built-in image pickup device. The images captured by the built-in image pickup device are usually saved as JPEG (Joint Photographic Experts Group) files. Most users prefer using scanning apparatuses to scan the text documents as PDF files because the texts and signs contained in the PDF files are readable by the computer systems and may be converted as editable text files.

As known, optical character recognition (OCR) is a process of capturing an image of a document and then extracting the texts from that image. It is possible to analyze images that are captured from the image pickup device by the OCR technique and saved as JPEG files. As a consequence, individual texts or signs contained in the JPEG files are recognized and converted as editable text files. Since the associated OCR techniques are well established, the image pickup device is gradually adopted to obtain electronic files of the documents.

When an image pickup device of a notebook computer is used to capture the image of a document, some difficulties possibly occur. For example, it is critical to hold the document steady. For capturing the image of an article contained in the document by the image pickup device of the notebook computer, if this document is held by the user's hand, the document is readily rocked due to the long holding time. Under this circumstance, the obtained document image is usually blurred. For preventing from rocking of the document and thus obtaining a sharp document image, a static document stand is used for holding the document steady. The use of the document stand, however, incurs another problem. In a case that the document stand is used in other places, the user should carry the notebook computer and the document stand at the same time, which is very troublesome to the user.

For convenience, the document is directly placed on a working plane (e.g. a desk plane) without the need of the document stand. After the document is placed on a proper location of the working plane, the upper cover of the notebook computer is rotated such that the image pickup device is aligned with or close to the document. Meanwhile, the image of the document may be captured by the image pickup device. When the image pickup device of the notebook computer is used to capture the image of the document placed on the working plane, some drawbacks also occur. The common drawback is occurrence of a distorted image. If the shooting range of the image pickup device is insufficient, the image captured by the image pickup device for a single time is usually incomplete. For solving this drawback, the user usually takes photographs of the document for two times in order to obtain two incomplete images. By means of image processing techniques, these two incomplete images are combined together. In other words, after the upper-half portion of the document is captured by the image pickup device, the document should be moved such that the lens of the image pickup device is aligned with the lower-half portion of the document and the image of the lower-half portion is captured. Since there is no reliable reference tool or reference point on the document, the document is readily aslant during movement of the document. Consequently, the document after being moved fails to be parallel with the original location of the document. Under this circumstance, the image of the lower-half portion of the document is distorted and is unsuccessfully combined with the upper-half portion of the document. For obtain a sharp image, it is necessary to re-capture the document. In other words, the distorted image is troublesome to the user.

Recently, a commercially available notebook computer has a fixing recess for securely fixing a business card on a proper position. The fixing recess is disposed in the front edge of the case of the notebook computer. After the card is received within the fixing recess, a sharp image of the business card will be captured by the image pickup device. The notebook computer with the fixing recess is applicable to capture the images of business cards. In other words, since the documents having a size larger than the business card fails to be sharply captured, these relatively larger documents are unable to comply with user's requirement.

SUMMARY OF THE INVENTION

It is an object of the present invention to provide a document fixer for fixing an ordinary document or a business card.

Another object of the present invention provides a portable document fixer.

A further object of the present invention provides a document fixer capable of smoothly and horizontally moving on a working plane.

In accordance with an aspect of the present invention, there is provided a document fixer for fixing a business card or an ordinary document to facilitate an image pickup device to capture an image of the business card or the ordinary document. The document fixer includes a supporting plate and a fixer body. The supporting plate is used for fixing the business card or the ordinary document. The supporting plate includes two ribs, a business card fixing recess for receiving the business card therein to facilitate the image pickup device to capture the image of the business card, and a clamping part for clamping a first edge of the ordinary document and receiving the first edge of the ordinary document therein. The fixer body includes a sustaining surface, a first supporting plate receiving part for receiving the supporting plate therein to facilitate the image pickup device to capture the image of the business card, an ordinary document fixing recess for receiving a second edge of the ordinary document therein, and a second supporting plate receiving part for receiving supporting plate therein. Multiple notches are formed in sidewalls of the second supporting plate receiving part. The two ribs of the supporting plate are inserted into two of the notches such that the supporting plate is combined with the fixer body.

In an embodiment, the fixer body further includes a storing part for storing the supporting plate therein.

In an embodiment, the storing part further includes a clamping part storing recess, which is engaged with the clamping part of the supporting plate when the supporting plate is stored in the storing part of the fixer body.

In an embodiment, the storing part further includes two rib storing recesses, which are engaged with the two ribs of the supporting plate when the supporting plate is stored in the storing part of the fixer body.

In an embodiment, the image pickup device is arranged on a notebook computer.

In an embodiment, the sustaining surface of the fixer body is a slant surface, and a front side of the notebook computer has another slant surface complementary to the slant surface of the fixer body.

In an embodiment, the sustaining surface of the fixer body is moved on a case of the notebook computer while the sustaining surface of the fixer body is sustained against the case of notebook computer.

In an embodiment, the fixer body has multiple graduations thereon for indicating the size of the ordinary document or other articles.

In an embodiment, there is an included angle between an upper surface and a lower surface of the ordinary document fixing recess of the fixer body for facilitating introducing the ordinary document into the ordinary document fixing recess.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
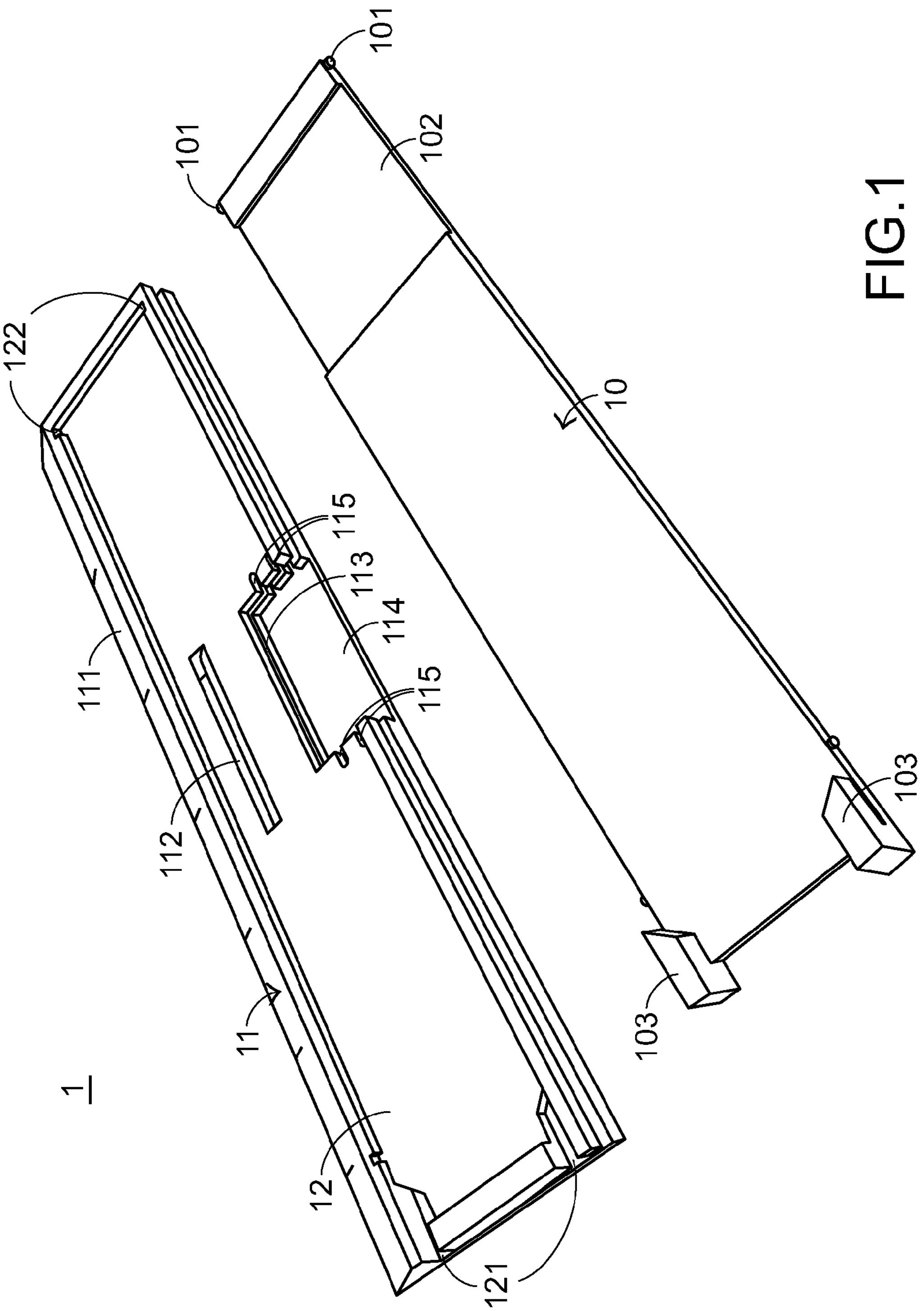
FIG. 1 is a schematic view illustrating a scanning path of a scanning apparatus according to a preferred embodiment of the present invention.

FIG. 1 is a schematic exploded view illustrating a document fixer according to a preferred embodiment of the present invention. As shown in FIG. 1, the document fixer 1 principally comprises a supporting plate 10 and a fixer body 11. The supporting plate 10 has two ribs 101. The fixer body 11 has a sustaining surface 111. The sustaining surface 111 is a slant surface. The supporting plate 10 has a business card fixing recess 102 for receiving a business card therein and a clamping part 103 for clamping an edge of an ordinary document. The fixer body 11 comprises a first supporting plate receiving part 112, an ordinary document fixing recess 113 and a second supporting plate receiving part 114. For fixing an ordinary document, two opposite edges of the ordinary document are respectively received in the ordinary document fixing recess 113 and the clamping part 103 of the supporting plate 10. That is, the document fixer 1 can fix the ordinary document by means of the clamping part 103 and the ordinary document fixing recess 113. In addition, multiple notches 115 are formed in the sidewalls of the second supporting plate receiving part 114.

The fixer body 11 further has a storing part 12 for storing the supporting plate 10. Corresponding to the clamping part 103 and the two ribs 101, the storing part 12 further comprises a clamping part storing recess 121 and two rib storing recesses 122, respectively. When the supporting plate 10 is stored in the storing part 12 of the fixer body 11, the clamping part storing recess 121 of the storing part 12 is engaged with the clamping part 103 of the supporting plate 10 and the rib storing recesses 122 are engaged with the ribs 101 of the supporting plate 10. As a result, the supporting plate 10 is stored in the storing part 12 and the document fixer 1 is substantially a rectangular slice. Since the thickness and the volume of the document fixer 1 are very small, the document fixer 1 is feasible for portability.

Figure 2:
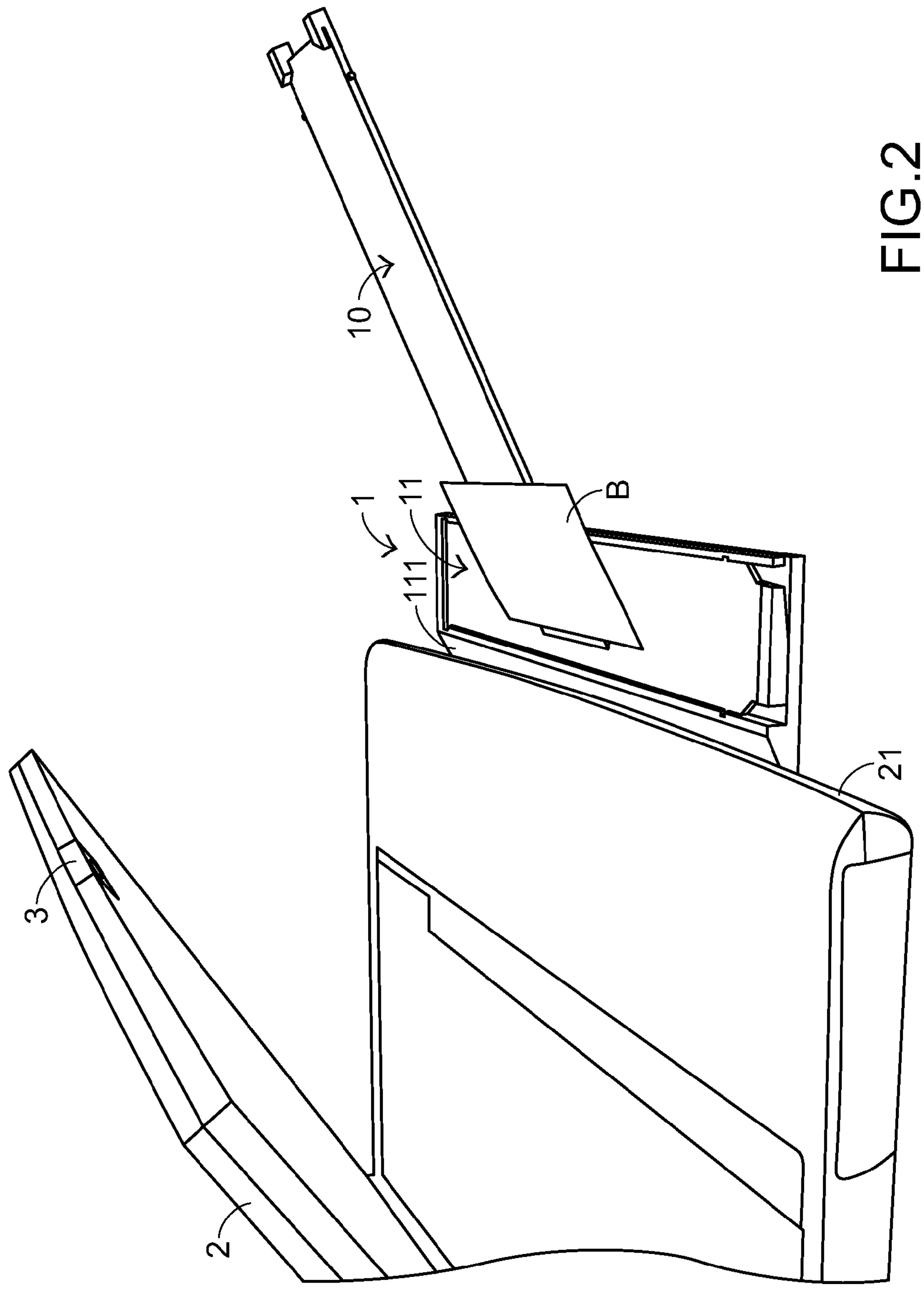
FIG. 2 is a schematic perspective view illustrating a notebook computer with the document fixer of the present invention for capturing an image of a business card.

Hereinafter, the uses of the image pickup device and the document fixer of the present invention to capture an image of a business card will be illustrated with reference to FIG. 2. FIG. 2 is a schematic perspective view illustrating a notebook computer with the document fixer of the present invention for capturing an image of a business card. As shown in FIG. 2, the notebook computer 2 is placed on a working plane. The notebook computer 2 has an image pickup device 3. The image pickup device 3 is disposed on an upper cover of the notebook computer 2. In addition, the notebook computer 2 has a slant surface 21 at a front side thereof. The slant surface 21 of the notebook computer 2 is complementary to the slant surface 111 of the fixer body 11. The document fixer 1 is also placed on the working plane. In the document fixer 1, the supporting plate 10 is partially received in the first supporting plate receiving part 112 of the fixer body 11 such that the supporting plate 10 is combined with the fixer body 11. Meanwhile, the document fixer 1 is operated in a business card shooting mode. For capturing the image of a business card B by the image pickup device 3, the business card B is received in the business card fixing recess 102 of the supporting plate 10 (as shown in FIG. 1) so as to hold the business card B. After the business card B is held by the business card fixing recess 102, the document fixer 1 in the business card shooting mode is moved toward the front side of the notebook computer 2 until the slant surface 111 of the fixer body 11 is contacted with the slant surface 21 of the notebook computer 2. In other words, after the fixer body 11 is sustained against the front side of the notebook computer 2, the business card B is securely fixed on the document fixer 1. Subsequently, the upper cover of the notebook computer 2 such that the image pickup device 3 on the upper cover is aligned with the business card B. Since the business card B is fixed on the document fixer 1 without being rocked, the image of the business card B captured by the image pickup device 3 is sharp.

Figure 3:
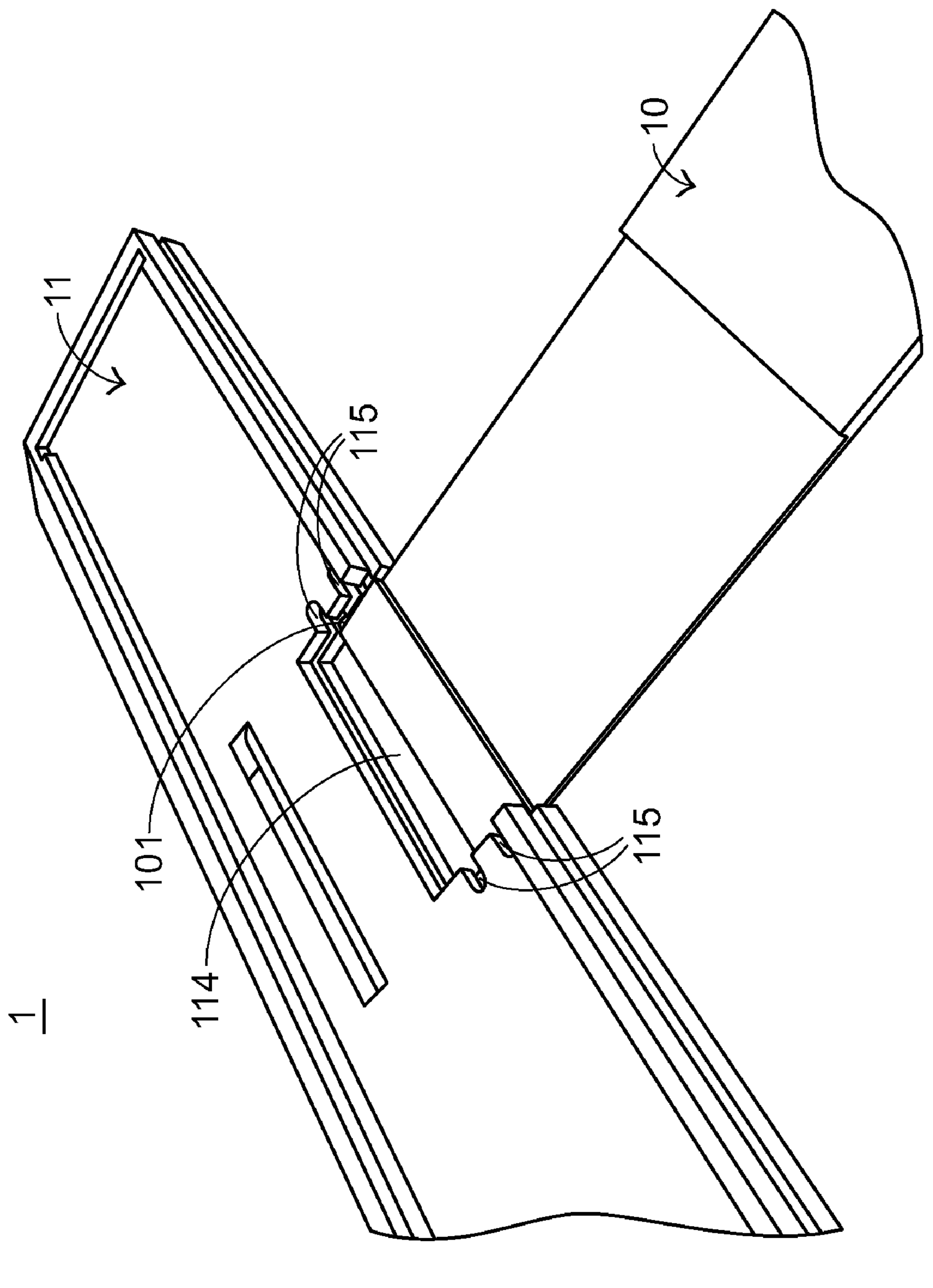
FIG. 3 is a schematic partial perspective view of the document fixer of the present invention in an ordinary document shooting mode.

The above embodiment is illustrated by using the document fixer of the present invention to fix a business card. Nevertheless, the document fixer of the present invention may be used to fix an ordinary document so as to facilitate the image pickup device to capture a sharp image of the ordinary document. FIG. 3 is a schematic partial perspective view of the document fixer of the present invention in an ordinary document shooting mode. As shown in FIG. 3, the supporting plate 10 is partially received in the second supporting plate receiving part 114 of the fixer body 11 and the ribs 101 of the supporting plate 10 are inserted into a pair of notches 115 formed in the sidewalls of the second supporting plate receiving part 114, so that the supporting plate 10 is combined with the fixer body 11 in another manner. Meanwhile, the document fixer 1 is operated in the ordinary document shooting mode.

Please refer to FIG. 3 again. In this embodiment, two pairs of notches 115 formed in the sidewalls of the second supporting plate receiving part 114. The locations of each pair of notches are dependent on the size of the ordinary document to be shot. For shooting a relatively larger-sized ordinary document, the ribs 101 of the supporting plate 10 should be inserted into the pair of notches 115 at the outer side. Whereas, for shooting a relatively smaller-sized ordinary document, the ribs 101 of the supporting plate 10 should be inserted into the pair of notches 115 at the inner side. As the number of the notches 115 is increased, more types of different size ordinary documents can be fixed by the document fixer 1 of the present invention.

Figure 4:
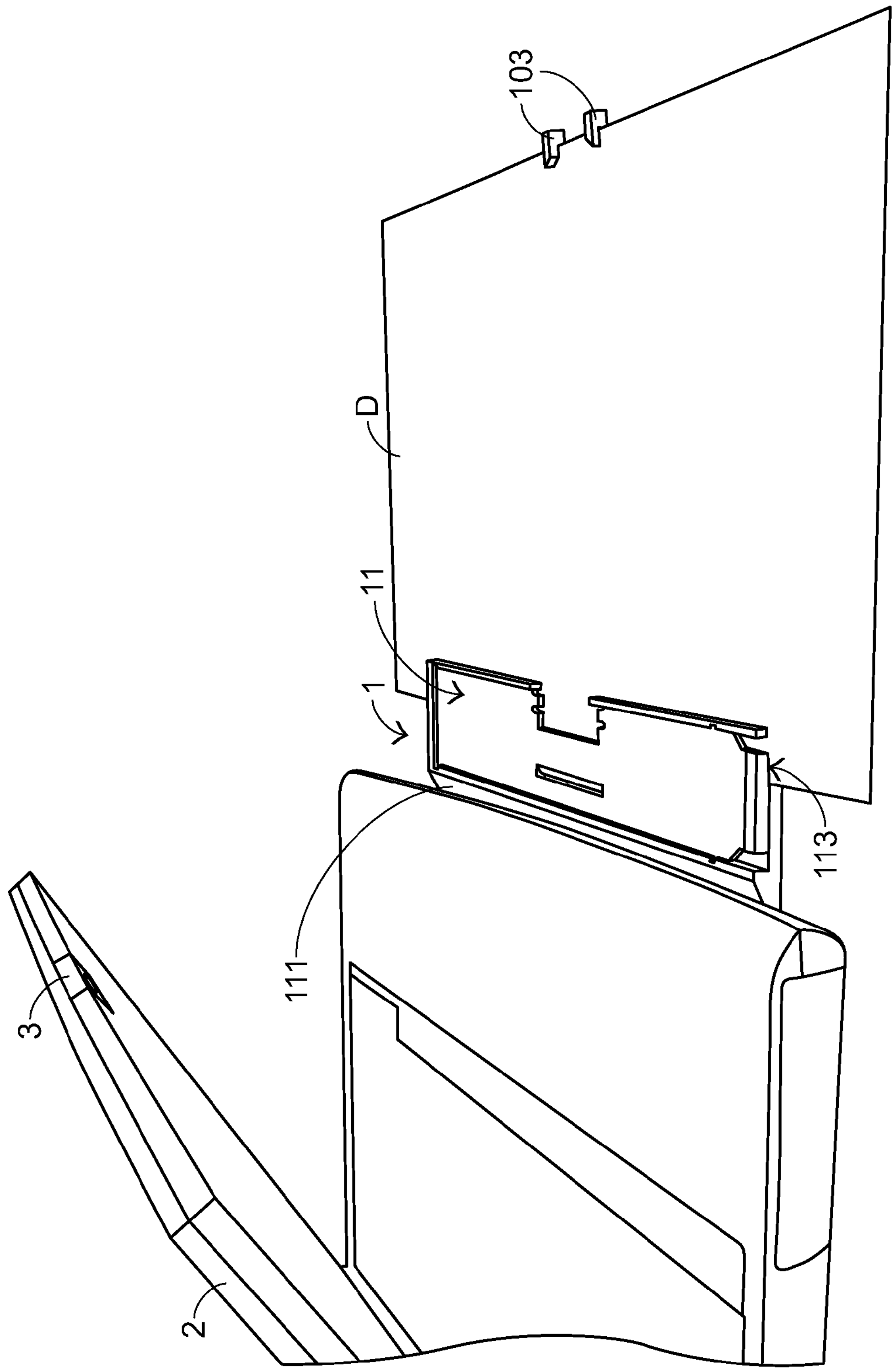
FIG. 4 is a schematic perspective view illustrating a notebook computer with the document fixer of the present invention for capturing an image of an ordinary document.

Hereinafter, the uses of the image pickup device and the document fixer of the present invention to capture an image of an ordinary document will be illustrated with reference to FIG. 4. FIG. 4 is a schematic perspective view illustrating a notebook computer with the document fixer of the present invention for capturing an image of an ordinary document. As shown in FIG. 4, the notebook computer 2 is placed on a working plane. The notebook computer 2 has an image pickup device 3 on an upper cover thereof. The document fixer 1 is also placed on the working plane. An ordinary document D has a first edge clamped by the clamping part 103 and a second edge received in the ordinary document fixing recess 113 of the document fixer 1 such that the ordinary document D is held by the document fixer 1. Meanwhile, the clamping part 103 is exposed above the ordinary document D. As shown in the side view of the fixer body 11, the ordinary document fixing recess 113 is defined by an upper surface and a lower surface. There is an included angle between the upper surface and the lower surface such that the ordinary document fixing recess 113 is gradually narrowed from the entrance to the end portion. In other words, the entrance of the ordinary document fixing recess 113 is relatively wider than the end portion for facilitating introducing the ordinary document D into the ordinary document fixing recess 113 through the entrance. Since the ordinary document fixing recess 113 is gradually narrowed from the entrance to the end portion, the second edge of the ordinary document D will be clamped in the ordinary document fixing recess 113 at the narrowest end portion thereof. After the ordinary document D is held by the document fixer 1, the document fixer 1 is moved toward the front side of the notebook computer 2 until the slant surface 111 of the fixer body 11 is contacted with the slant surface 21 of the notebook computer 2. Consequently, the document fixer 1 is fixed on the working plane without being rocked. Next, the upper cover of the notebook computer 2 is rotated such that the image pickup device 3 is aligned with the upper-half portion of the ordinary document D. Meanwhile, the image of the upper-half portion of the ordinary document D may be captured by the image pickup device 3. Since the slant surface 21 of the notebook computer 2 is complementary to the slant surface 111 of the fixer body 11, the document fixer 1 is sustained against the front side of the notebook computer 2. By maintaining the document fixer 1 to be sustained against the front side of the notebook computer 2, the ordinary document D is horizontally moved on the working plane until the image pickup device 3 is aligned with the lower-half portion of the ordinary document D. Meanwhile, the image of the lower-half portion of the ordinary document D may be captured by the image pickup device 3.

When the document fixer 1 is operated in the ordinary document shooting mode, the ordinary document D is horizontally moved on the working plane in order to capture the whole page of the ordinary document D. Under this circumstance, the image of the ordinary document D captured by the image pickup device 3 on the upper cover of the notebook computer is usually distorted as a tilted image. For correcting the image of the ordinary document D, an image processing procedure performs a trapezoidal correction on the image of the upper-half portion of the ordinary document D and the image of the lower-half portion of the ordinary document D in order to compensate the distortion. Next, the corrected images of the upper-half portion and the lower-half portion of the ordinary document D are combined together as a complete image of the ordinary document D. As previously described, it is difficult to combine two incomplete images together by the conventional image processing technique because there is no reliable reference tool or reference point on the document. In other words, the conventional image processing technique need to capture the images of the upper-half portion and the lower-half portion of the document for several times and then laboriously move the document until these two incomplete images may be combined as a complete image. On the other hand, the document fixer of the present invention can fix the business card or the ordinary document to be shot. Moreover, in accordance with a key feature of the present invention, the clamping part of the document fixer is served as a reference point. After the ordinary document is held by the document fixer, the clamping part is exposed above the ordinary document. After the images of the upper-half portion and the lower-half portion of the document are captured by the image pickup device, the reference point contained in the upper-half image may be aligned with the reference point contained in the lower-half image. As a consequence, by using the same reference point, the upper-half image and the lower-half image will be combined together as a complete image without difficulty. Moreover, since the edge of the ordinary document clamped by the clamping part is usually blank, the reference point may be easily deleted from the complete image without deteriorating the image completeness.

From the above description, the document fixer can be adapted to fix a business card or an ordinary document according to the combination between the supporting plane and the fixer body. Moreover, since the supporting plane can be stored in the storing part of the fixer body, the document fixer is feasible for portability. When the supporting plate is received in the first supporting plate receiving part of the fixer body, the document fixer is adapted to fix a business card to be shot. Whereas, when the supporting plate is received in the second supporting plate receiving part of the fixer body, the document fixer is adapted to fix an ordinary document to be shot. For measuring the size of the ordinary document or other articles, the fixer body of the document fixer has multiple graduations thereon. By referring to the graduations, the distance required to horizontally move the document fixer against the notebook computer is determined. Moreover, since the thickness and the volume of the document fixer are very small, the document fixer is feasible for portability. The document fixer of the present invention is able to fix the business card or the ordinary document and thus the practicability of the document fixer is enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A document fixer for fixing a business card or an ordinary document to facilitate an image pickup device to capture an image of said business card or said ordinary document, said document fixer comprising:

a supporting plate for fixing said business card or said ordinary document, wherein said supporting plate comprises two ribs, a business card fixing recess for receiving said business card therein to facilitate said image pickup device to capture said image of said business card, and a clamping part for clamping a first edge of said ordinary document and receiving said first edge of said ordinary document therein; and a fixer body comprising a sustaining surface, a first supporting plate receiving part for receiving said supporting plate therein to facilitate said image pickup device to capture said image of said business card, an ordinary document fixing recess for receiving a second edge of said ordinary document therein, and a second supporting plate receiving part for receiving supporting plate therein, wherein multiple notches are formed in sidewalls of said second supporting plate receiving part, and said two ribs of said supporting plate are inserted into two of said notches such that said supporting plate is combined with said fixer body.

2. The document fixer according to claim 1 wherein said fixer body further comprises a storing part for storing said supporting plate therein.

3. The document fixer according to claim 2 wherein said storing part further comprises a clamping part storing recess, which is engaged with said clamping part of said supporting plate when said supporting plate is stored in said storing part of said fixer body.

4. The document fixer according to claim 2 wherein said storing part further comprises two rib storing recesses, which are engaged with said two ribs of said supporting plate when said supporting plate is stored in said storing part of said fixer body.

5. The document fixer according to claim 1 wherein said image pickup device is arranged on a notebook computer.

6. The document fixer according to claim 5 wherein said sustaining surface of said fixer body is a slant surface, and a front side of said notebook computer has another slant surface complementary to said slant surface of said fixer body.

7. The document fixer according to claim 6 wherein said sustaining surface of said fixer body is moved on a case of said notebook computer while said sustaining surface of said fixer body is sustained against said case of notebook computer.

8. The document fixer according to claim 1 wherein said fixer body has multiple graduations thereon for indicating the size of said ordinary document or other articles.

9. The document fixer according to claim 1 wherein there is an included angle between an upper surface and a lower surface of said ordinary document fixing recess of said fixer body for facilitating introducing said ordinary document into said ordinary document fixing recess.

* * * * *